(12) United States Patent
Nielsen

(10) Patent No.: US 6,536,599 B1
(45) Date of Patent: Mar. 25, 2003

(54) METHOD AND SYSTEM FOR PORTIONING AND ORIENTATING WHOLE FISH OR OTHER ELONGATE, NON-SYMETRICAL ARTICLES

(76) Inventor: Ulrich Carlin Nielsen, Hjarbæksvej 20, DK-8680 Ry (DK), 8680

( * ) Notice: Subject to any disclaimer, the term of this patent is extended or adjusted under 35 U.S.C. 154(b) by 0 days.

(21) Appl. No.: 09/673,642

(22) PCT Filed: Apr. 29, 1999

(86) PCT No.: PCT/DK99/00235

§ 371 (c)(1),
(2), (4) Date: Dec. 21, 2000

(87) PCT Pub. No.: WO99/57016

PCT Pub. Date: Nov. 11, 1999

(30) Foreign Application Priority Data

Apr. 30, 1998 (DK) .................................. 0599/98
Mar. 10, 1999 (DK) ........................................ 1999 00338

(51) Int. Cl.[7] ............................ B07C 5/16; B65B 35/56
(52) U.S. Cl. ...................... 209/540; 209/541; 209/542; 209/592; 209/645; 209/656
(58) Field of Search ................................ 209/540, 541, 209/542, 545, 592, 573, 595, 645, 656–657, 916; 53/143, 144

(56) References Cited

U.S. PATENT DOCUMENTS

| | | | | | |
|---|---|---|---|---|---|
| 1,354,251 | A | * | 9/1920 | Heath | 209/605 |
| 2,819,575 | A | * | 1/1958 | Ervine | 53/143 |
| 3,104,756 | A | * | 9/1963 | Walker | 198/470.1 |
| 3,313,394 | A | * | 4/1967 | Mills et al. | 53/446 |
| 3,408,926 | A | * | 11/1968 | Rogerson | 100/49 |
| 3,451,191 | A | * | 6/1969 | Eriksen | 53/142 |
| 4,051,952 | A | * | 10/1977 | Hauptmann et al. | 209/539 |
| 4,107,904 | A | * | 8/1978 | Helgesen | 53/142 |
| 4,246,739 | A | * | 1/1981 | Rogerson | 53/438 |
| 4,758,778 | A | * | 7/1988 | Kristinsson | 324/692 |
| 4,799,351 | A | * | 1/1989 | Blanda | 53/446 |
| 5,010,713 | A | * | 4/1991 | Leander | 53/142 |
| 5,115,903 | A | | 5/1992 | Leander | |
| 5,165,219 | A | * | 11/1992 | Sekiguchi et al. | 53/493 |
| 5,291,983 | A | * | 3/1994 | Pegoraro et al. | 198/399 |
| 5,998,740 | A | * | 12/1999 | Kvisgaard et al. | 177/25.18 |

FOREIGN PATENT DOCUMENTS

| | | |
|---|---|---|
| DE | 1 454 085 | 12/1968 |
| EP | 0 359 824 | 3/1988 |
| EP | 0 548 383 | 6/1993 |
| GB | 2 116 732 A * | 9/1983 |
| JP | 6-179402 * | 6/1994 |
| JP | 11-94632 * | 4/1999 |
| WO | WO 96/08322 | 3/1996 |

OTHER PUBLICATIONS

Patent Abstracts of Japan, 10–099793, "Weighing Sorting Device", Apr. 21, 1998, 1 pages, Inventor: Inada Minoru and Masumori Katsuie.

* cited by examiner

Primary Examiner—Donald P. Walsh
Assistant Examiner—Joseph C Rodriquez
(74) Attorney, Agent, or Firm—Nixon Peabody LLP; David S. Safran

(57) ABSTRACT

A method and system for packaging batches of elongate, non-symmetrical products that are soft and/or flexible in nature, such as fish, in which the products are arranged in mutually reversed orientations for maximized utilization of package space. The products are weighed for determining their individual weights and a computerized control is used to selectively accumulate the products on the basis of product weight and other predetermined criteria, to merge the products into groups, and to automatically deposit the products into boxes with a mutual reversed orientation.

11 Claims, 3 Drawing Sheets

METHOD AND SYSTEM FOR PORTIONING AND ORIENTATING WHOLE FISH OR OTHER ELONGATE, NON-SYMETRICAL ARTICLES

BACKGROUND OF THE INVENTION

1. Field of the Invention

The present invention relates to the batching or grouping of products, such as whole fishes, which are elongate and asymmetrical about their middle, typically with reference to packings appearing as simple boxes, e.g., of expanded polystyrene, with a content of a higher or smaller number of fishes in two or more layers, or perhaps not strictly made up of neat layers.

2. Description of Related Art

Salmon is a typical example of fish handled in the initially mentioned manner, packed with or without their heads intact. Fish in such packings are usually accounted for in terms of weight, for delivery, e.g., to slicing enterprises or large kitchens. For the building up of reasonably compact packings, it is considered important to arrange the fishes in the boxes so that they are oriented in mutually opposite directions in at least approximately equal numbers, whether or not distributed strictly layer-wise in the box. Hereby, the top side of the packed goods will be substantially level, irrespective of the products being narrower at one end than at their opposite end, and thus, the boxes may be loaded in a compact manner.

Traditionally, the associated weighing, orienting and packaging operations have been carried out fully manually, with inherent possibilities of producing packings of approximately uniform weight and size as desirable from a customer's point of view, a.o., for facilitating the associated accounting.

However, it is already known that the weighing-out of the products, for a building up of desired total target weight portions in a plurality of receiver stations, can be based on a grader technique, according to which the products are serially supplied to a dynamic weighing station and, therefrom, conveyed further along a sorter line including a plurality of receiver stations and diverter means operable to divert products selectively into any of these receiver stations, controlled by a computer connected with the weighing station. Once informed of the desired target weight or even different weights, the computer will be suited to control the sorting out of the products in such a manner that each receiver station will automatically receive products building up to the relevant target weight or weight range. This is highly facilitating for the required manual work, and it is advantageous for the producer, not only because of the reduced need of manual activities, but also because the resulting packings are much more likely to really hold the target weight, without undue overweight or so-called "give-away".

Thus, practically the only remaining manual activity will be to arrange the products in the individual portions or packings such that the products are oppositely oriented as mentioned above, just implying a turning of some of the products lengthwise. This does not require any particular skill, so generally the use of the said grader technique is highly advantageous.

In connection with the present invention, however, it has been realized that the said computer may in fact be utilized even for effecting a qualified turning of a relevant number of products in the individual portions, thus obviating even the said unskilled manual work.

SUMMARY OF THE INVENTION

At its outset, the invention is based on the idea that, once the computer has decided into which receiver station a given product should be delivered, it will be operable to also hold information as to the orientation of the products previously allocated to that particular receiver station. Thus, basically, it could convey a message to an operator, indicative of "please turn this fish", but in practice, it is highly preferable, according to the invention, to arrange for mechanical turning means operable to effect the required turnings based on the knowledge of the computer with respect to the sequential delivery of products to the individual receiver stations. In this manner, it will be possible to effect a relevant turning, e.g., of every second allocated product or of any number of successively allocated products to any receiver station such that the result will be packings in which approximately one half of the products are turned in an opposite direction with respect to the other approximate half, whether or not being arranged in specific layers.

This principle is based on the computer instituting operations resulting in a turning of a partial number of products or rather a "relative turning" thereof, in order to achieve the desired result. For example, the computer could control some of the products to be turned 90° in one direction, while all other products are turned 90° in the opposite direction. Such turnings can be effected in a variety of different ways as discussed in more detail below.

According to another aspect of the invention, mechanical turning means can be entirely avoided, provided it is ensured beforehand that the products as delivered to the weighing station, e.g., on a conveyor belt, are already arranged systematically with alternating orientations, irrespective of how this has been arranged for. One possibility is the use of a feeder belt passing a loading station in which two operators place on the belt respective products with the same orientation, yet with mutually opposite orientations, in an alternating manner. The grader computer, now not being able to effect product turning, nevertheless will have at disposal for the batching calculations, a flow of products of which some are already turned, i.e., it can determine relevant allocations with an associated selection of correctly oriented products. "Correct orientation," here, will be opposite orientation relative to the foregoing product allocated, respectively, to each of the individual receiver stations. For high efficiency, this kind of operation may require an increased number of receiver stations.

According to a further aspect of the invention, it is not strictly necessary to make use of the grader computer for other than its ordinary purpose, because a further possibility will be to arrange at each receiver station a "product arrival sensor" operatively connected with an associated local turning device in such a manner that every second product will be automatically turned before delivery to the final product batch. These devices may, as well as the computer, be programmable so as to effect turning of any preset number of consecutive products following any number of consecutive unturned products and prior to receiving further consecutive unturned products in the respective individual receiver stations.

It should be noted that the invention is not limited to the said "batching to predetermined weight", as it will apply equally to mere sorting operations or to the weighing out of product portions according to other criteria, e.g., "batching to minimum weight," which implies that batching goes on until a preset minimum weight has been reached, no matter the surplus or give-away weight involved for the attainment of the minimum weight. Such a batch, normally for delivery to a specific customer, may well comprise a number of different products according to specified orders, e.g. specified numbers of salmons from specified weight ranges with a top filling of smaller salmons up to a total minimum weight.

In the following invention is described in more detail with reference to the drawings.

DETAILED DESCRIPTION OF THE INVENTION

Figure 1:
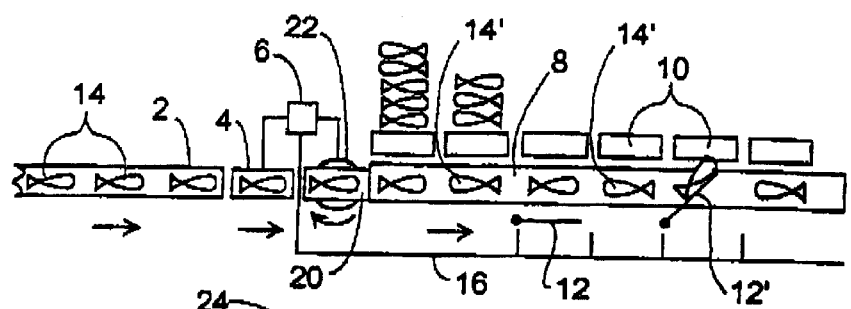
FIG. 1 is a schematic view of an embodiment of a system according to the invention.

In FIG. 1 the basic principle of the invention is illustrated. The basic sorter/grader apparatus is shown, comprising an inlet feeder conveyor 2, a dynamic weighing station 4 with an associated weighing computer 6, and an after-coupled sorter conveyor 8 which passes along a row of receiver stations 10, each associated with diverter means, such as an oppositely arranged wing member 12, which can be swung inwardly over the belt 8 as shown at 12' in order to effect diversion of a conveyed article 14 into any selected receiver station 10. Such a selection is effected by the computer 6 which, via a control line 16, serves to selectively actuate the diverter wings at appropriate moments of time for diverting specific articles 14 to specific receiver stations 10. In this way, it is possible to build-up, in each receiver station, a batch of products 14 with a precisely determined accumulated weight, whether such weight being a predetermined target weight or just a registered weight of, e.g., a certain number of fish, or a weight fulfilling some minimum weight criterion.

Between the weighing station 4 and the sorter belt 8, there is provided a belt section 20 which is mounted on a horizontally rotatable support structure 22, to the effect that the individual fishes can pass to the conveyor 8 either straightly or turned 180°, governed by the computer 6. On the feeder conveyor 2 the fish 14 are supplied with uniform orientation, preferably "head first," and during the operation, it will thus be possible to rearrange some of the fish into a "tail first" position, as shown 14'.

As soon as a fish has left the weighing station 4, the computer 6 will know to which receiver station 10 the fish is allocated. If this particular station is empty, whether by initial starting up or after emptying of the station upon the building up of a previous full batch, the first fish or few fish may pass to that station with unchanged orientation, but thereafter, when one or few further fish are allocated to the same station 10, it will be actual to effect a turning of that or these fishes, and the computer 6 will serve to actuate the turner structure 22 correspondingly, turning the belt 20 and reversing its moving direction such that, after the turning, it will still deliver the fish further to the sorter belt 8.

In normal operation, the fish will be delivered to the individual receiver stations rather irregularly, but despite this irregularity, the computer 6 will steadily keep track of the orientation of the fish lastly allocated to each particular receiver station. In this way, it is easily determined automatically whether an actually weighed-in fish should be turned or not in order to contribute to the desired shape of the batch, to which this particular fish is allocated.

Figure 2:
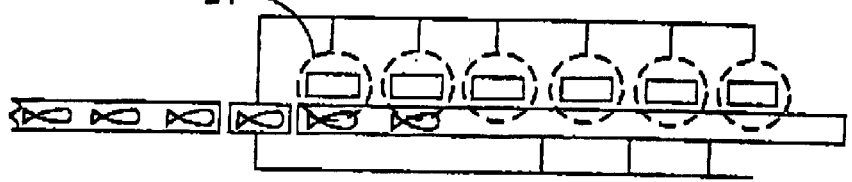
FIGS. 2–7 are similar views of further embodiments.

While FIG. 1 will thus illustrate the principle of the invention, this system will not be particularly advantageous in practice, because turning of the structure 22 will take some time, whereby the flow of the fish cannot be particularly rapid. In practice, therefore, it is preferred that the relevant turning be effected upon the arrival of the fish to the individual receiver stations, as illustrated in FIG. 2, by the inclusion of a turning structure 24 in each single receiver station. On the conveyor 8, the fish will then proceed with unchanged, uniform orientation, and the computer will operate the different turning structures 24 in a selective manner, in accordance with the sequential allocation of fishes to the individual stations 10.

Figure 3:
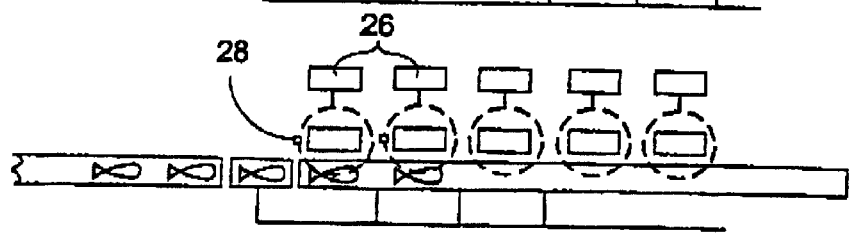

In FIG. 3, a similar result will be achieved, but in this case, the turning structures are not operated by the computer, but by means of local control units 26 in connection with respective sensors 28 detecting the arrival of a fish to the associated station 10. The control may be very simple, as each of the turning structures 24 may be methodically turned 180° in connection with the passage of every second fish to the respective stations 10. On the other hand, the control units 26 may be set so as to control the turnings for the building up of layers with any number of fish turned one way and the other, respectively.

Figure 4:
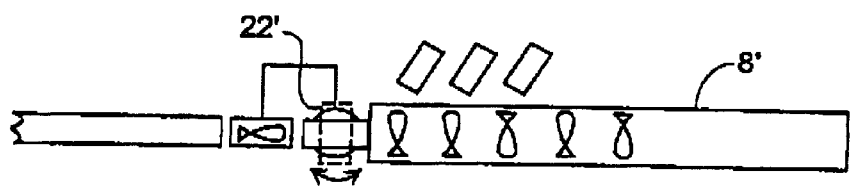

FIG. 4 is a modified version of FIG. 1, illustrating that, while the fish are still fed to the weighing station with longitudinal orientation in the feeding direction, the turning structure 22' may be controlled so as to effect turning of the fish through 90° only viz, turning the "turn selected" fish 90° in one direction and turning all other fish 90° in the opposite direction. Thereby, the fish will be transferred to the sorter belt 8' with a crosswise orientation, but otherwise turned as required for correct delivery to their respective destinations. This will or may imply that even the receiver stations may be orientated generally crosswise of the conveying direction, whereby they can be arranged with reduced mutual spacing along the sorter conveyor. Of course, the turning structure 22' should be made so as to enable the fish to be let out crosswise to the in-feeding direction, with the use of pusher means or otherwise.

Figure 5:
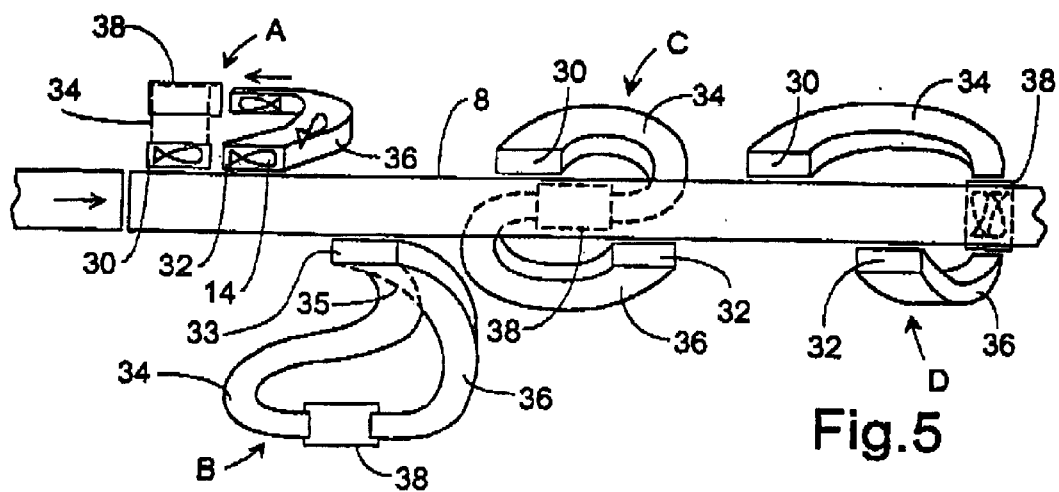

In FIG. 5, a system is illustrated that will not require any movable turning means. Each effective receiver station A, C and D comprises two distinct receiver openings 30 and 32 arranged one after the other along the sorter belt 8' and each connected to respective chutes 34 and 36 leading to a collector station 38. In station A, chute 36 is arranged so as to guide a fish 14 from the opening 32 first forwardly, then outwardly and finally rearwardly for delivery of the fish, now turned 180°, to the collector station 38, while the chute 34 delivers fish from the opening 30 directly to that station 38. Thus, for each receiver station, the computer 6 will arrange for delivery of fish selectively to the two openings 30 and 32 in order to effect the relevant relative turnings.

FIG. 5 also shows, in station C, an alternative arrangement, with the openings 30 and 32 located at opposite sides of the belt 8 and with the chutes 34 and 36 extending so as to effect feeding to the collector station 38 from opposite ends thereof, that station 38 here being arranged underneath the belt 8. The chute 34 will turn the fish through 180°, while in chute 36 they will be turned through 360°. In station D is shown a further alternative, by which the chutes 34 and 36 both turn all fish by 90°, yet again in respective opposite directions, whereby the fish are merged as required in the crosswise arranged collector station 38 underneath the belt 8.

Finally, in station B, it is shown that it may be superfluous to make use of two inlet openings to each receiver station, as the fish may be guided through the respective chutes from a single opening 33, with the use of a computer controlled switch plate 35.

In the grader technique, it is already known that it is possible to place two receiver stations 10 right opposite to each other, at opposite sides of the sorter belt 8, and still operate them in a selective manner. This, of course, will be another alternative to the systems shown in FIG. 5, instead of the receiver openings 30, 32 being staggered along the belt. On the other hand, with the use of chutes, it will, in principle, be a simple matter of choice which two receiver openings should belong to a given collector station 38; the openings need not even be neighbors.

Figure 6:
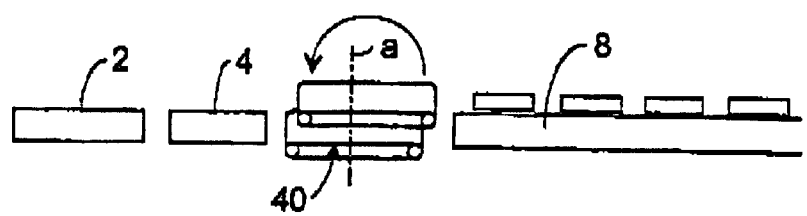

In FIG. 6, it is suggested that the turning structure be constituted by a pair of plates or small belt conveyors 40 operable to receive a fish between them and then to be rotated through 180° about the transverse, horizontal middle axis a of this assembly, whereby the fish, in being turned upside down, will also be turned to an opposite orientation as required in a system according to FIG. 1. The structure 40 could be replaced by a tubular member.

Figure 7:
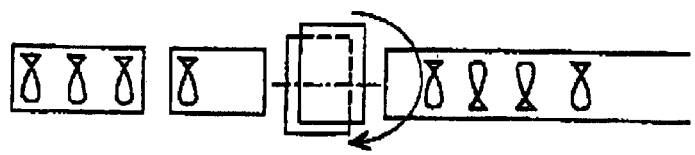

FIG. 7 shows a similar arrangement in connection with the conveying of the fishes with crosswise orientation. In this case the said middle axis should be the longitudinal axis. The resulting selective turnings will be relevant for the operation of a sorter conveyor 8' as in FIG. 4.

Figure 8:
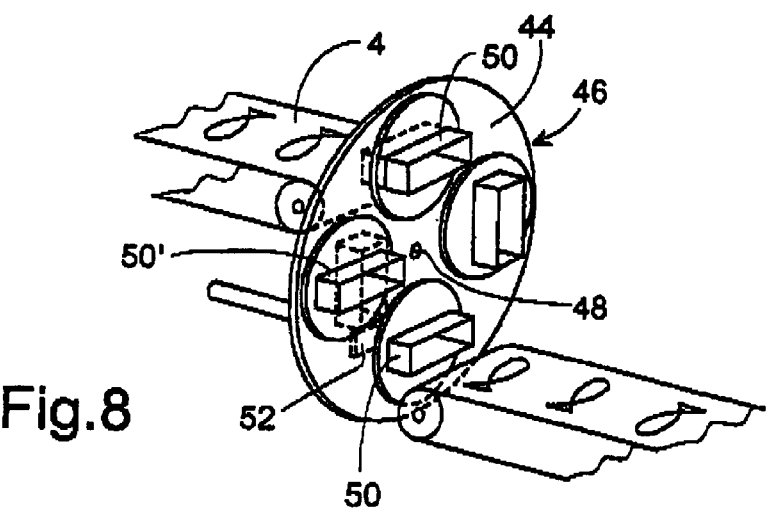
FIG. 8 is a perspective view of a particular turning arrangement.

In order to increase the handling capacity of such a system, it is possible to make use of a number of transfer devices as shown schematically in FIG. 8. Here, as an example, four rotary discs 44 are arranged on or in a common carrier plate 46 mounted in a vertical plane just outside the discharge end of the weighing station 4, rotatably about a center bearing 48. Each disc 44 has a rectangular through-hole lined with a short tubular frame structure 50 suited to receive a crosswise disposed fish from the station 4, when assuming an uppermost, horizontal position. By rotating of the carrier plate 46, the frame 50 can be swung down to a lower position just in front of the sorter conveyor 8, and the fish housed in the frame structure, now with inverted orientation, can be pushed out onto the conveyor 8 by means of a suitable pushing element 52. Actuator means (not shown) are provided for selectively rotating the discs 44 through 180° relative to the carrier plate 46 while they move from the upper to the lower position, as indicated by the frame designated 50', this frame having been turned 90° since it left the said upper position. It will turn a further 90° until it reaches the lover position, and thus, the fish will, in this case, be brought to enter the conveyor 8 without having changed its orientation. Thus, the turning/non-turning operations can be effected dynamically during the conveying of the fish, such that the product flow can remain high.

Figure 9:
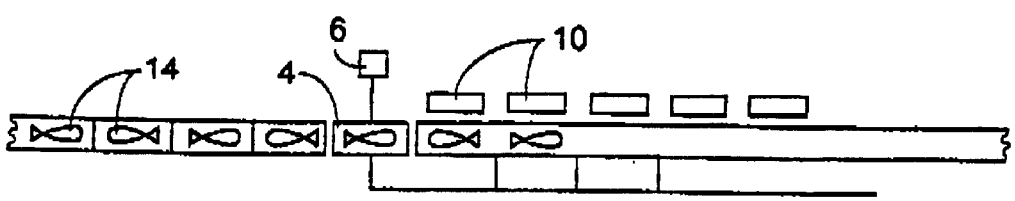
FIGS. 9 and 10 are views corresponding to FIGS. 1–7 of modified systems according to the invention.

FIG. 9 illustrates the above mentioned possibility of arranging the fish 14 on the feeding conveyor 2 with alternating orientations, which are maintained throughout the passage of the fishes through the weighing station 4 and along the sorter converter 8. The computer 6, in order to determine the allocation of a fish of a specific, suitable weight to any individual receiver station 10, will enable such an allocation only if the new fish is oriented correctly for such an allocation, compared with the orientation of the fish delivered to such a selected receiver station. If the new fish is rejected for this reason, the computer will seek to allocate it to another receiver station, in which its orientation is acceptable, and of course, also its weight, even if its weight is not exactly the best choice for an ideal allocation.

As mentioned, the alternating orientation of the fish on the feeder conveyor 2 may be a result of a manually controlled loading of this conveyor, but another possibility is to feed the system with products of uniform orientation and then automatically effect an inversion of every second or some other number of consecutive products, e.g., according to published European Patent Application EP-A-0 359 824, before the products entering the weighing station 4. The determination of which products should there after be inverted for the purpose of the invention, with its associated irregular input to the individual receiver stations, will then be the domain of the present invention, whatever principle it is based upon.

Figure 10:
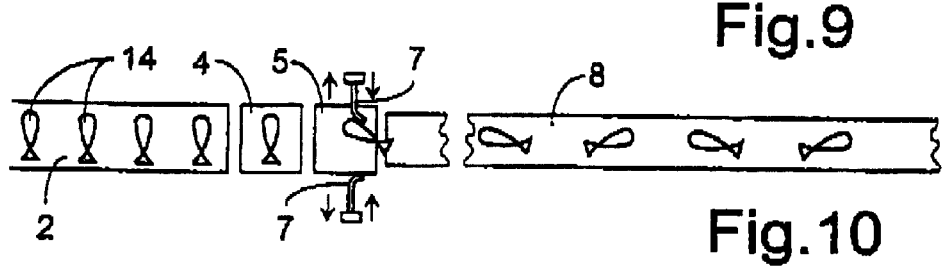

In FIG. 10, an alternative is shown, in which the products 14 are arranged with uniform orientations crosswise of the feeding conveyor 2. After the weighing station 4, the products are passed to a further, short and broad conveyor 5, above which there is mounted a transversely reciprocal system comprising two opposed arms 7 which, in an alternating manner, can be brought to project slightly into the conveying path of the products whereby these, owing to their friction with the conveyor belt, will be turned as illustrated, through somewhat less than 90° With the alternating operation of the arms 7, the products will thus be turned to assume almost opposite orientations, sufficiently for the purpose of the invention.

A preferred system according to the invention is the one illustrated in FIG. 2 and for that sake in FIG. 3, involving the use of individual turning means 24 associated with each of the receiver stations 10. These turning means may be designed in a variety of different manners. In a basic embodiment, they will merely be means for supporting the final product boxes in a turnable manner, such that the products can be delivered to the boxes directly from the conveyor 8. However, this is not too advantageous for the capacity of the system, because each receiver station will then be inoperative during the turning of the boxes and during periods in which a finished box is removed and replaced by a new box. It is preferred, therefore, to use an intermediate buffer container, and such a system, by way of example, is shown in FIG. 11.

Figure 11:
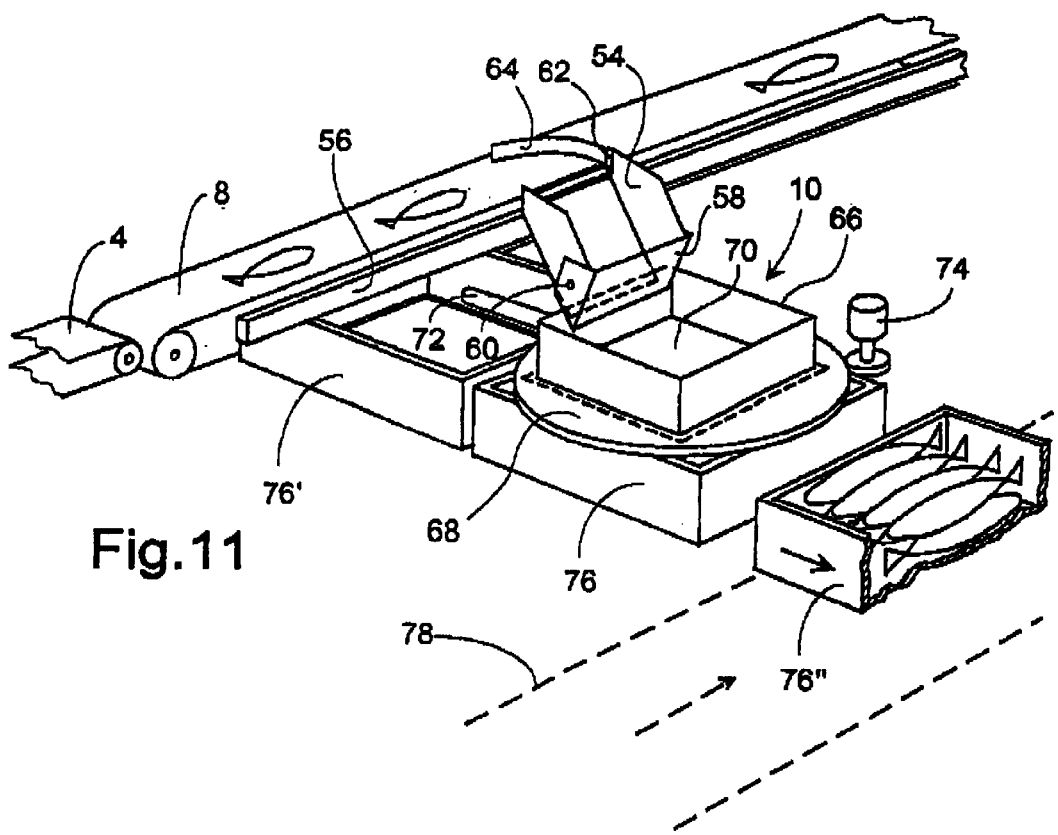
FIG. 11 is a perspective view of a relevant product receiving station.

FIG. 11 shows the weighing station 4, the sorter conveyor 8, and a single receiver station 10. This station comprises a collector bin 54 mounted on a fixed rail 56 at the side of the conveyor 8, the bin having a sloping bottom leading to an openable end stop wall 58 that is hinged to the sides of the bin at 60. Also mounted on the rail 56 is a pivot pin 62 for a diverter wing 64 operable to be swung between the active position shown and a position closing the entrance to the bin.

During normal operation, the stop wall 58 will be open, whereby allocated fish will pass to an underlying box member 66, which is rigidly mounted on a rotatable disc 68 and provided with a bottom valve plate 70 which is retractable by means of a cylinder 72 in order to open the bottom entirely. The disc 68 is in driving engagement with a motor 74 operable to rotate the disc through 180°. The structure 68,74 is supported by a machine chassis (now shown).

A packing box 76 is placed underneath the plate 68, and a similar box 76' may be placed so as to be ready to be displaced into this position when the box 76 has been filled.

Based on the description of FIG. 2 it will be readily understood that once the box member 66 has received as many fishes as preset to be allocated with a first orientation, the bottom plate 70 can be opened for dropping these fish down into the box 76. During this operation with associated reclosing of the bottom plate 70, the stop wall 58 is held closed so that the receiver station is still capable of receiving further allocated fish to a certain extent. The stop wall 58 is reopened as soon as the bottom plate has been closed, and then, the next partial number of fish, adapted for delivery to the box 76 with inverted orientation, is collected in the box member 66. Then, the stop wall 58 is closed, and the motor 74 is actuated for rotating the box 66 through 180°, whereafter the cylinder 72 is actuated to open the box bottom, and thus, drop the fish onto those dropped in the first place. Collection of the next following number of fish can start as soon as the bottom plate 70 has been re-closed; there is no need to first return the box member into its original position, as such a returning can wait until the next fish turning becomes due.

When the box 76 has been filled to the relevant degree, it is pushed out to the position 76', e.g., for delivery to a conveyor 78, and at the same time, the box 76' will be displaced to the filling position. During these shifting operations, the box member 66 may well start receiving the first partial number of fish for the new box 76. If the shifting has been completed before this new number has been fully counted, then the new operation can proceed as described above; otherwise, it may be required to effect closing of the stop wall 58 and initiate accumulation of the next following partial number in the bin 54. Upon completion of the shift, the box bottom 70 should be opened and closed for dumping of the first partial number of fish in the new box, whereafter the stop wall 58 can be reopened.

If desired, one or more additional buffer boxes can be arranged. Also, this or these boxes may be large enough to hold as many fish as the boxes 76, since it is then a possibility to arrange a complete box portion in the buffer box, turning the same as required without opening the bottom plate 70. In this manner, e.g., in connection with a temporary operation stop at the exit end of the system, it is possible to continue the portioning-out at full capacity during some time, building up full portions in both the boxes 76 and the buffer boxes 66, even followed by an initial collection in the bins 54. Even in normal operation, it may be chosen to buildup the whole box contents in the turnable buffer boxes, and thus, to fill up the boxes 76 by one fast dumping operation.

Figure 12:
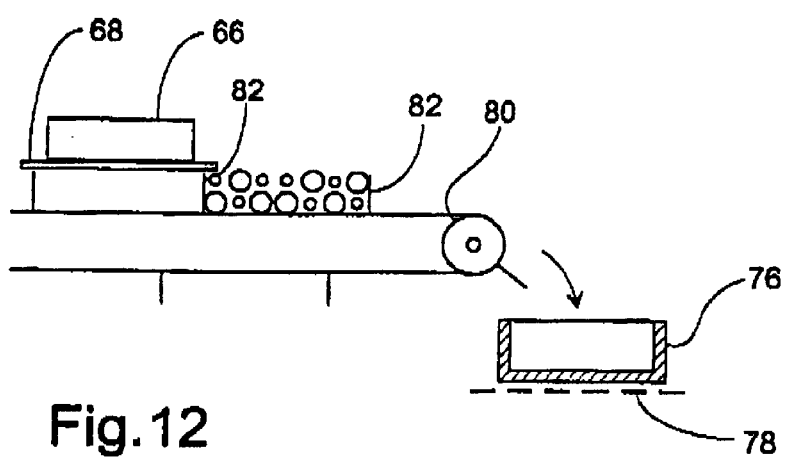
FIG. 12 is a side view of a relevant box filling station.

Instead of the row of boxes 76 as shown in FIG. 11, it may be preferred to use a conveyor belt 80 as exemplified in FIG. 12. This belt is provided with upstanding entrainment plates 82 capable of holding between them the full charge for a box 76 placed at the exit end of the conveyor 80. Thus, the whole charge will be dumped into the box, obviously without any particular stratification with reference to the orientation of the fish. This, however, is of minor importance as long as the numbers of fish with respective opposite orientations are substantially equal.

It should be mentioned that the invention may be applied also to the weighing-out technique denoted "combinatory weighing", where products are diverted at random to a row of weighing containers, whereafter a computer determines which of the products should be let out for being merged into a portion in which their weights will combine into a desired target weight. Also in this connection it will be possible to arrange for relevant turning of some of the products or, in accordance with the principle behind FIGS. 9 and 10, to provide for an increased number of weighing containers divided in two groups, one holding products with one orientation and the other holding products with the opposite orientation as arranged for beforehand. The computer, in determining relevant candidates of products to be merged, may then look for products having not only a relevant weight, but also a relevant orientation.

It should be mentioned that it will be possible to make use of sensor means such as a vision equipment to detect the orientation of the articles fed to (or leaving) the weighing station or even arriving at the individual receiver stations, whereby corresponding results may be obtained without special prescriptions as to the, orientations of the successively supplied fish.

What is claimed is:

1. A method of providing weight determined groups of products which are elongate, non-symmetrical between a first front end and a second rear end thereof, and at least one of soft and flexible in nature, said products being supplied, without regard to the front end to rear end orientations of successive products, to a grouping station in which the products are arranged for packaging into boxes in accordance with preset criteria for total batch weight and mutual reversed orientation of the first front end and second rear end of the products, said method comprising the steps of:

weighing the products for determining individual weights of the products;

utilizing a computerized control to selectively accumulate the products, which are at least one of soft and flexible in nature, into groups on the basis of product weight and said preset criteria for total batch weight and mutual reversed orientation of the first and second ends of the products, to track the front end to rear end orientation of the products being supplied to said grouping station and of last-accumulated products in each of said groups, and to automatically deposit the products into boxes with said mutual reversed orientation.

2. A method according to claim 1, said method further comprising:

feeding the products to a weighing station of a grouping station with a uniform orientation;

conveying the products along a sorting conveyor;

using a diverter to selectively transfer products to associated receiver stations positioned along the sorting conveyor; and orienting the products with a mutually reversed orientation according to a predetermined pattern by turning of some of the products.

3. A method according to claim 2, wherein said orienting step is controlled by a computerized control upon determination of a selected one of the receiver stations to which individual products are to be allocated.

4. A method according to claim 3, wherein the turning of said orienting step is performed by turning of a collection container.

5. A method according to claim 3, wherein the turning of said orienting step is performed by turning of an intermediate receiver and then delivering reversed products to a collection container.

6. A method according to claim 3, wherein the turning of said orienting step is performed by a guide chute which turns products prior to delivery thereof to a collector container.

7. A method according to claim 2, wherein the turning of said orienting step is performed by turning products to be reversed in orientation through an angle other than 180° while turning other products through a complementary angle in order to orient said other products 180° relative to the products which are reversed in orientation.

8. A method according to claim 2, wherein the turning of said orienting step is performed in a respective one of the receiver stations to which products to be turned are transferred upon detection of arrival of a product to be turned.

9. A method according to claim 2, wherein the turning of said orienting step is performed prior to said weighing step.

10. A computerized batching system for selectively accumulating products into batches according to product weight, comprising:

a product weigher;

a conveying device;

product orienting means for reversing the orientation of a first longitudinal end and a second longitudinal end of products which are elongate, non-symmetrical between said first longitudinal end and second longitudinal end thereof, and at least one of soft and flexible in nature;

a product collecting station for collecting of the products into said batches;

means for tracking front end to rear end orientation of the products being supplied to said product collecting station and of products last-collected in each of said batches; and a computerized control means for facilitating the production of said batches of a desired weight range in accordance with weight outputs from the product weigher and in accordance with preset criteria and said tracking of front end to rear end orientation of the products by controlling the orientation of products supplied, without regard to the front end to rear end orientations of successive products, to said product collection station via said orienting means for producing close packaging of the elongate, non-symmetrical products of at least one of soft and flexible in nature in a mutually reversed orientation.

11. A computerized batching system according to claim 10, wherein said product orienting means comprises a horizontal, rotatable buffer container arranged between a grouping station and a collector container at said collecting station.

* * * * *